Patented Aug. 26, 1947

2,426,206

UNITED STATES PATENT OFFICE 2,426,206

CONDENSATION PRODUCTS OF TRI-(BETA-AMINOETHYL)-AMINE AND ORTHO HYDROXY AROMATIC CARBONYLS

Lyle A. Hamilton, Pitman, and Charles J. Pedersen, Penns Grove, N. J., assignors to E. I. du Pont de Nemours & Company, Wilmington, Del., a corporation of Delaware No Drawing. Application November 7, 1945, Serial No. 627,281

9 Claims. (Cl. 260—566)

This invention relates to new chemical compounds and more particularly to condensation products of tri-(beta-aminoethyl)-amine with ortho-hydroxy aromatic carbonyls.

It is known that many organic products tend to oxidize and deteriorate in the presence of oxygen. Frequently, such organic products become contaminated with, or come into contact with, metals and metal compounds which are active to catalyze the oxidation and deterioration of such organic products.

It has been proposed to condense various amines with certain ketones and aldehydes to produce compounds of the Schiff's base type which are effective to varying degrees in inhibiting the oxidation and deterioration of organic products. Some of such compounds are effective to inhibit oxidation and deterioration of the organic products in the presence of oxygen and in the absence of catalytically active metals and their compounds but are substantially ineffective in the presence of such catalytically active metals. Other compounds of the Schiff's base type, particularly those derived from certain diamines and ortho-hydroxy aromatic aldehydes, as disclosed in Patent 2,181,121 to Downing et al., are effective to overcome the catalytic effect of copper and its compounds and are known as copper deactivators or metal deactivators. Generally, such metal deactivators are effective to deactivate only one or two metals and, hence, are of rather limited usefulness because organic products frequently come into contact with a number of different catalytically active metals.

It is an object of the present invention to provide new chemical compounds. Another object is to provide new chemical compounds of the Schiff's base type which are the condensation products of a tri-(beta-aminoethyl)-amine with an ortho-hydroxy aromatic carbonyl. A further object is to provide chemical compounds of the Schiff's base type which are particularly effective for suppressing the catalytic activity of most of the metals with which oxidizable organic products are ordinarily brought into contact. Other objects are to advance the art. Still other objects will appear hereinafter.

The above and other objects of our invention may be accomplished by providing compounds of the formula

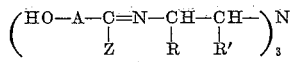

wherein each of R and R' represents a member of the group consisting of hydrogen and methyl radicals, Z represents a member of the group consisting of hydrogen and alkyl, aralkyl and aryl radicals and A represents an ortho-divalent aromatic radical. We have found that such compounds may be readily prepared by the condensation of one mol of a tri-(beta-aminoethyl)-amine with three mols of an ortho-hydroxy aromatic carbonyl whereby the carbonyl group condenses with the primary amino group. In general, such compounds are effective to suppress the catalytic action of vanadium, chromium, iron, cobalt, nickel and copper and their catalytically active compounds on the oxidation of oxidizable organic products. These compounds are unusual in this respect since most metal deactivators are effective to suppress the catalytic activity of only one or two of such metals.

The amines, from which our compounds are prepared, are the tri-(beta-aminoethyl)-amines of the general formula

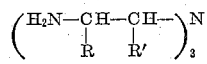

wherein each of R and R' represents a member of the group of hydrogen and methyl radicals. Preferably, however, the compounds are prepared from tri-(beta-aminoethyl)-amine itself wherein each of R and R' in the formula represents hydrogen solely.

The ortho-hydroxy aromatic carbonyls, employed for producing our compounds, are the aldehydes and ketones which may be represented by the formula

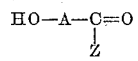

wherein Z represents hydrogen or an alkyl, aralkyl, or aryl radical and A represents an ortho-divalent aromatic radical. Preferably, Z represents hydrogen or a hydrocarbon radical and particularly an alkyl radical. Also, A is preferably a hydrocarbon radical of the benzene series and particularly phenylene.

The preferred compounds are those derived from salicylaldehyde and 2-hydroxyacetophenone and particularly trisalicylal (tri-(beta-aminoethyl)-amine and tri-(2-hydroxyacetophenone) tri-(beta-aminoethyl)-amine. Other desirable compounds are those derived from tri(beta-aminoethyl)-amines and 2-hydroxy-5-chlorobenzaldehyde, 2-hydroxy-5-methylbenzaldehyde, 2-hydroxy-3-methoxybenzaldehyde, 2,4-dihydroxybenzaldehyde, 2-hydroxy-5-phenylbenzaldehyde, 2-hydroxy-3-naphthaldehyde, 2-hydroxy-5-(tertiary-butyl)-benzaldehyde, 4-hydroxypyridine-aldehyde - 3, 2 - hydroxyacetophenone, 2-hydroxy-4-methylacetophenone, 2-hydroxy - 5 - methylacetophenone, 2 - hydroxypropiophenone, 2 - hydroxy-5-chloropropiophenone, and 2-hydroxybenzophenone.

The ortho-hydroxy aromatic carbonyls, which may be employed to produce our novel compounds, may contain halogens, nitro groups, or groups such as

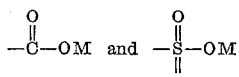

wherein M is a salt-forming group or element such as ammonium, lithium, sodium, potassium, and magnesium.

The compounds of our invention include salts wherein the hydrogen atoms of the hydroxy groups are replaced by metals or other suitable cations such as lithium, sodium, potassium, magnesium, calcium, strontium, barium, zinc, cadmium, tin, ammonium and tetra-alkyl ammonium. Some of such salts, such as those of the alkali metals, are water-soluble and are particularly suitable for use in aqueous systems.

The compounds of this invention are yellow products which are generally crystalline when pure. They are insoluble in water, but form water-soluble salts and are soluble in alcohols. They are sufficiently soluble in hydrocarbons, such as gasoline, lubricating oils and the like and in rubber so that they may be dissolved therein in an amount sufficient to protect such products against the catalytic action of metals. These compounds may be readily prepared by mixing the amine and the ortho-hydroxy aromatic carbonyl at room temperatures. Their preparation is usually facilitated by carrying out the reaction in a solvent, such as water, dilute aqueous alkali, methanol, alcohol and the like. The reaction is exothermic and hence it will generally be desirable to add one of the reactants gradually to the other, employing cooling if desired.

As illustrative of the preparation of these compounds, trisalicylal tri-(beta-aminoethyl)-amine was prepared by dissolving 14.05 grams (0.05 gram-mol) of tri-(beta-aminoethyl)-amine trihydrochloride in 20 cc. of water and then adding 6 grams sodium hydroxide (0.15 gram-mol) as 30% aqueous solution and 10 cc. methanol. To this solution were added 18.3 grams of salicylaldehyde (0.15 gram-mol). The mixture warmed up spontaneously and deposited dull greenish-yellow crystals. The crystals were filtered off, washed with water and recrystallized from methanol. The purified crystals were bright yellow and melted at 90.4° C.

Compounds of our invention are particularly useful for addition to oxidizable organic products which are brought into contact with or which may be contaminated with catalytically active metals. The amount of the compounds added to the organic materials will be dependent upon the amount of metal catalylst present in the organic materials. Generally, the compounds will be added in an amount equal to about 5 to about 30 times the amount of catalytic metal present.

In order to illustrate the desirable properties of our new compounds, the following example is given:

EXAMPLE

To a cracked gasoline which had been completely refined but which was otherwise untreated with chemical agents, such as dyes, anti-knocks and antioxidants, and which had an induction period of 120 minutes, was added 0.0025% of 4 - (n - butylamino) - phenol, an antioxidant, whereby the induction period was raised to 375 minutes. To different samples of this gasoline, there was added gasoline soluble salt of the catalytic element (indicated by the chemical symbols of the element) in the indicated concentrations in parts per million of the element. To portions of these samples, there was added 0.005% by weight of tri-salicylal tri-(beta-aminoethyl)-amine (deactivator B) and of tri-(2-hydroxyacetophenone) tri-beta-aminoethyl)-amine (deactivator C). The induction periods of the various samples were then determined by the Voorhees-Eisinger induction method described in J. I. E. C. 25, 397 (1933). The results are given in the following table:

*Table*

| Deactivator | Voorhees-Eisinger Induction Period in Minutes | | | | | | |
|---|---|---|---|---|---|---|---|
| | No catalyst | V 0.8 P. P. M. | Cr 0.81 P. P. M. | Fe 0.87 P. P. M. | Co 0.92 P. P. M. | Ni 0.92 P. P. M. | Cu 1.0 P. P. M. |
| None | 375 | 80 | 355 | 305 | 175 | 305 | 45 |
| B | 410 | 275 | 420 | 395 | 355 | 320 | 300 |
| C | 375 | 275 | 400 | 335 | 335 | 360 | 250 |

When disalicylal propylenediamine was tested in the same manner as that described above, it was found that while it was effective to deactivate copper, it was ineffective to deactivate chromium or nickel and actually increased the pro-oxidant effects of iron and cobalt. This is illustrative of the effects obtained with Schiff's base type compounds heretofore proposed as metal deactivators as in Patents 2,181,121, 2,181,122, 2,255,597, 2,284,267, 2,285,259 and 2,285,260.

It will thus be apparent that, by our invention, we have provided a class of new chemical compounds which can be readily prepared. These compounds have novel properties which render them useful and valuable in applications where related compounds of the prior art are not applicable.

We claim:

1. A compound of the formula

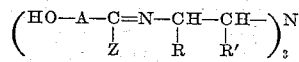

wherein each of R and R' represents a member of the group consisting of hydrogen and methyl radicals, Z represents a member of the group consisting of hydrogen and alkyl, aralkyl and aryl radicals and A represents an ortho-divalent aromatic radical.

2. A compound of the formula

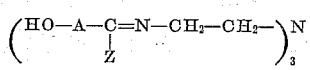

wherein Z represents a member of the group consisting of hydrogen and alkyl, aralkyl and aryl radicals and A represents an ortho-divalent aromatic radical.

3. A compound of the formula

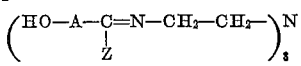

wherein A represents an ortho-divalent hydrocarbon radical of the benzene series and Z represents a member of the group consisting of hydrogen and alkyl, aralkyl and aryl radicals.

4. A compound of the formula

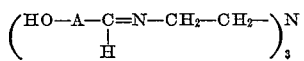

wherein A represents an ortho-divalent aromatic radical.

5. A compound of the formula

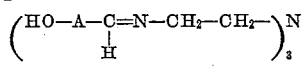

wherein A represents an ortho-divalent aromatic radical of the benzene series.

6. A compound of the formula

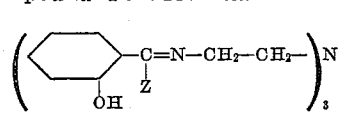

wherein Z represents a member of the group consisting of hydrogen and alkyl, aralkyl and aryl radicals.

7. A compound of the formula

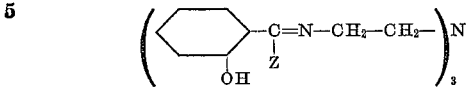

where Z represents an alkyl radical.

8. Trisalicylal tri-(beta-aminoethyl)-amine.

9. Tri-(2-hydroxyacetophenone) tri-(beta-aminoethyl)-amine.

LYLE A. HAMILTON.
CHARLES J. PEDERSEN.

REFERENCES CITED

The following references are of record in the file of this patent:

UNITED STATES PATENTS

| Number | Name | Date |
|---|---|---|
| 2,181,121 | Downing et al. | Nov. 28, 1939 |
| 2,282,513 | Downing et al. | May 12, 1942 |
| 2,285,260 | Downing et al. | June 2, 1942 |

Certificate of Correction

Patent No. 2,426,206. August 26, 1947.

LYLE A. HAMILTON ET AL.

It is hereby certified that errors appear in the printed specification of the above numbered patent requiring correction as follows: Column 3, lines 10 to 13 inclusive, for that portion of the formula reading

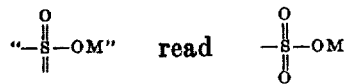

column 3, line 75, for "catalylst" read *catalyst*; column 4, line 24, for "tri-beta-aminoethyl)-amine" read *tri-(beta-aminoethyl)-amine*; and that the said Letters Patent should be read with these corrections therein that the same may conform to the record of the case in the Patent Office.

Signed and sealed this 14th day of October, A. D. 1947.

[SEAL]

THOMAS F. MURPHY,
*Assistant Commissioner of Patents.*